US006721103B1

(12) United States Patent
Strickland

(10) Patent No.: US 6,721,103 B1
(45) Date of Patent: Apr. 13, 2004

(54) METHOD FOR FABRICATING LUNEBURG LENSES

(75) Inventor: Peter C. Strickland, Ottawa (CA)

(73) Assignee: EMS Technologies Canada Ltd., Ottawa (CA)

(*) Notice: Subject to any disclaimer, the term of this patent is extended or adjusted under 35 U.S.C. 154(b) by 0 days.

(21) Appl. No.: 10/259,889

(22) Filed: Sep. 30, 2002

(51) Int. Cl.[7] .......................... G02B 9/00; H01Q 15/24

(52) U.S. Cl. ........................ 359/642; 359/668; 343/909; 343/911

(58) Field of Search ................................ 359/642, 668; 343/909, 743, 754, 772, 911, 701

(56) References Cited

U.S. PATENT DOCUMENTS

| | | | | | |
|---|---|---|---|---|---|
| 3,133,285 A | | 5/1964 | Jordan et al. | | |
| 3,307,196 A | | 2/1967 | Horst | | |
| 3,470,561 A | | 9/1969 | Horst | | |
| 3,914,769 A | | 10/1975 | Andrews | | |
| 5,677,796 A | | 10/1997 | Zimmerman et al. | | |
| 5,781,163 A | | 7/1998 | Ricardi et al. | | |
| 5,900,847 A | * | 5/1999 | Ishikawa et al. | ............ | 343/909 |
| 6,175,335 B1 | * | 1/2001 | Ishikawa et al. | ............ | 343/704 |
| 6,356,246 B1 | * | 3/2002 | Nakamura et al. | .......... | 343/911 |

FOREIGN PATENT DOCUMENTS

| | | |
|---|---|---|
| GB | 1125828 | 9/1966 |
| WO | WO 93/10572 | 5/1993 |

OTHER PUBLICATIONS

Tewksbury, S.K. et al.; Luneberg Lens: Initial Comments; Stevens Institute of Technology;.

Dept. Electrical and Computer Engineering General Report; May 7, 1999.

Rayner, M.; Use of the Luneburg Lens for Low Profile Applications; Microwave Product Design; Dec. 99.

* cited by examiner

*Primary Examiner*—Scott J. Sugarman
*Assistant Examiner*—M. Hasan
(74) *Attorney, Agent, or Firm*—Shapiro Cohen; Dennis R. Haszko

(57) ABSTRACT

A dielectric lens including a plurality of wedges being formed from a dielectric material, each of the plurality of wedges being substantially identical and orange-slice shaped and including two planar surfaces separated by an angular width, and each of the plurality of wedges having a plurality of gaps for altering an effective permittivity of the dielectric lens, wherein the plurality of wedges form the dielectric lens by connecting the plurality of wedges along the planar surfaces such that each of the planar surfaces intersect along a common line.

12 Claims, 2 Drawing Sheets

METHOD FOR FABRICATING LUNEBURG LENSES

BACKGROUND TO THE INVENTION

1. Field of Invention

The present invention relates to a dielectric lens, such as a Luneburg lens. More particularly, this invention relates to fabricating a dielectric lens having gaps in the dielectric material to provide an optimal permittivity distribution within the lens.

2. Discussion of the Prior Art

In the field of antenna engineering, lens antennas have many applications in the higher Radio Frequency (RF) bands, particularly in the microwave and higher portions of the electromagnetic spectrum Both the lens antenna and the reflector antenna are capable of producing a scanning beam without the motion of the lens or the reflector, or a motion of the entire antenna assembly. However, the lens antenna is more versatile than the reflector antenna in terms of producing wide-angle scanning beams.

A dielectric lens antenna, such as a Luneburg lens, is capable of producing a beam in any chosen direction by locating the feed at the focal point on the opposite side of the lens from the desired beam peak. In the case of the hemispherical Luneburg lens over a conductive plane, a beam peak may be produced within the hemisphere containing the lens. The hemispherical Luneburg lens is of interest for aeronautical applications due to its low profile and correspondingly low drag. The hemispherical Luneburg design may reduce the height of the antenna by as much as 50% for a given beamwidth.

For further background, the "Mathematical Theory of Optics", written by R. K Luneburg, published by the University of California Press, Berkeley, 1964, discusses the theory of the Luneburg lenses applicable to this document.

Hemispherical lenses are generally discussed in "Fields and Waves in Communication Electronics", written by Ramo, Whinnery, and Van Duzen, published by John Wiley & Sons, Section 12.19 Lenses for Direction of Radiation, pp.676–678.

The fabrication of Luneburg lenses is typically very costly. The use of conventional techniques to produce Luneburg lenses requires multiple shells—each different from the others and manufactured to exacting tolerances. A technique has not yet been devised for the manufacture of such lenses that work acceptably well at frequencies at or above 44 GHz.

Most Luneburg lenses that exist today have been fabricated using the shell technique. Essentially, the Luneburg lens is fabricated from layers of concentric spherical surfaces. Each surface has a finite thickness and a slightly different index of refraction from the others such that the permittivity of the overall structure approximates the desired continuously varying index of the lens. This shell technique is commonly referred to as the "onion" model method of fabrication. While the shell technique is effective in most low frequency terrestrial applications, it is unsuitable in high frequency aeronautical applications. In particular, the shells must be very thin and large in number to obtain good focusing at high frequencies. This makes the lenses complex and costly to produce. The large number of junctions between the surfaces results in discontinuities that reduce the gain of the antenna system formed from the lens. The materials used in these shell type lenses have problems with out-gassing at altitude and this can detrimentally alter the lens characteristics over time.

Fabrication of the lens from parallel slices has been proposed as a manner of solving the out-gassing problem and increasing the number of layers implemented. The principal problem with the slice technique is its cost. The slice technique requires that each slice be different from the other slices in the hemispherical lens if the slices are horizontal. As a result, a large number of different pieces are machined, assembled and laminated together at great cost.

The tapered hole approach has been proposed as a means of making low cost lenses. However, it has been found that the large hole diameter in the outer surface results in gaps that introduce excessive discontinuities particularly when the polarisation of the electric field is aligned with the length of the hole.

U.S. Pat. No. 5,677,796, issued to Zimmerman, discloses a method of constructing a spherical lens. Zimmerman teaches the use of a spheroid of uniform isotropic material that has a uniform dielectric constant throughout the fabrication process. Holes are drilled along a longitudinal axis extending radially from the centre of the lens in order to alter the lens dielectric constant. In a particular embodiment, Zimmerman adjusts the cross-sectional area of the holes to alter the dielectric constant of the lens. In contrast to the present invention, Zimmerman discloses the fabrication of the lens from a spheroid of uniform isotropic material, and not a sphere formed from identical wedges having identical permittivity distributions. Furthermore, the holes are drilled in order to alter the effective permittivity of the entire lens, as opposed to altering the permittivity of each individual wedge.

U.S. Pat. No. 3,470,561, issued to Horst, discloses a spherical dielectric lens constructed from a number of identical orange-slice shaped wedges. The wedges are fabricated from a dielectric material having a varying concentration of conductive slivers embedded inside each wedge. The concentration of the slivers in each wedge varies its dielectric constant in directions normal to the thickened edge of each wedge. Horst does not teach varying the dielectric constant of the individual wedges by drilling holes in a pattern into each orange-sliced wedge.

In view of the above shortcomings in the prior art, the present invention seeks to provide a dielectric lens that is fabricated from a number of identical wedges having specific patterns of gaps in the dielectric material—i.e, patterns of holes. The number of wedges may be selected to achieve any desired approximation to the ideal Luneburg lens permittivity distribution. Finer discretization of the permittivity allows the lens to be used at higher operating frequencies.

SUMMARY OF THE INVENTION

The present invention provides a low cost method for fabricating a hemispherical or spherical Luneburg lens. The lens is manufactured from a number of identical elements, hereinafter termed wedges, where each wedge is defined by two planes having a common line which passes through the center of the lens. A plurality of holes, hereinafter termed gaps in the dielectric, are cut in each wedge at a position approximately normal to the radial direction of the lens. The position of the gaps in the dielectric alters the effective permittivity distribution within each individual wedge. These gaps are drilled, molded or produced by other means in a pattern on each wedge such that their permittivity varies radially so as to approximate the ideal permittivity distribution of a Luneburg lens. The gaps may have any shape, circular, square, or other. The permittivity can also be altered either by producing the gaps partially through the lens or all the way through the lens The gaps in the dielectric are essentially air voids, or voids filled with an alternative dielectric, that alters the effective permittivity of the lens. This has the particular advantage of ease of manufacture. In one embodiment, the gaps are produced offset to each other along different wedges in order to minimize discontinuities and resonances in the lens once the wedges are laminated together into a hemispherical or spherical structure.

In an alternate embodiment, the gaps in the dielectric may be constructed by cutting holes in the wedges and then filling these holes with material that has an alternative permittivity. The alternative permittivity may be lower or higher than that of the surrounding lens. The distribution of gaps is quite different in the two cases however. Filling of the gaps with material could minimize problems associated with ingress of moisture.

One advantage of the present invention is that the lens is fabricated from a number of identical pieces, thereby reducing the cost of manufacturing. Furthermore, the method of producing gaps in the dielectric into the individual wedges optimizes the permittivity of the entire lens. The end result is a hemispherical or spherical lens that operates at higher frequencies, and which has lower manufacturing costs than the methods of the prior art. Smaller hole sizes at closer spacing allow operation at higher frequencies. Furthermore, the present invention enables the lens to be fabricated with materials that do not have out-gassing problems.

In a first embodiment, the present invention provides a method of fabricating a dielectric lens including the steps of:

a) forming a plurality of wedges from a dielectric material, each of said plurality of wedges being substantially identical and orange-slice shaped, each of said plurality of wedges having two planar surfaces separated by an angular width, and each of said plurality of wedges having a plurality of gaps for altering an effective permittivity of said dielectric lens; and b) assembling a hemispherical lens by connecting said plurality of wedges along said planar surfaces such that each of said planar surfaces intersect along a common line.

In a second embodiment, the present invention provides a dielectric lens including a plurality of wedges being formed from a dielectric material, each of said plurality of wedges being substantially identical and orange-slice shaped and including two planar surfaces separated by an angular width, and each of said plurality of wedges having a plurality of gaps for altering an effective permittivity of said dielectric lens, wherein said plurality of wedges form said dielectric lens by connecting said plurality of wedges along said planar surfaces such that each of said planar surfaces intersect along a common line.

DETAILED DESCRIPTION

The invention will be described for the purposes of illustration only in connection with certain embodiments; however, it is to be understood that other objects and advantages of the present invention will be made apparent by the following description of the drawings according to the present invention. While the preferred embodiment is disclosed, this is not intended to be limiting. Rather, the general principles set forth herein are considered to be merely illustrative of the scope of the present invention and it is further understood that numerous changes may be made without straying from the scope of the present invention.

Figure 1:
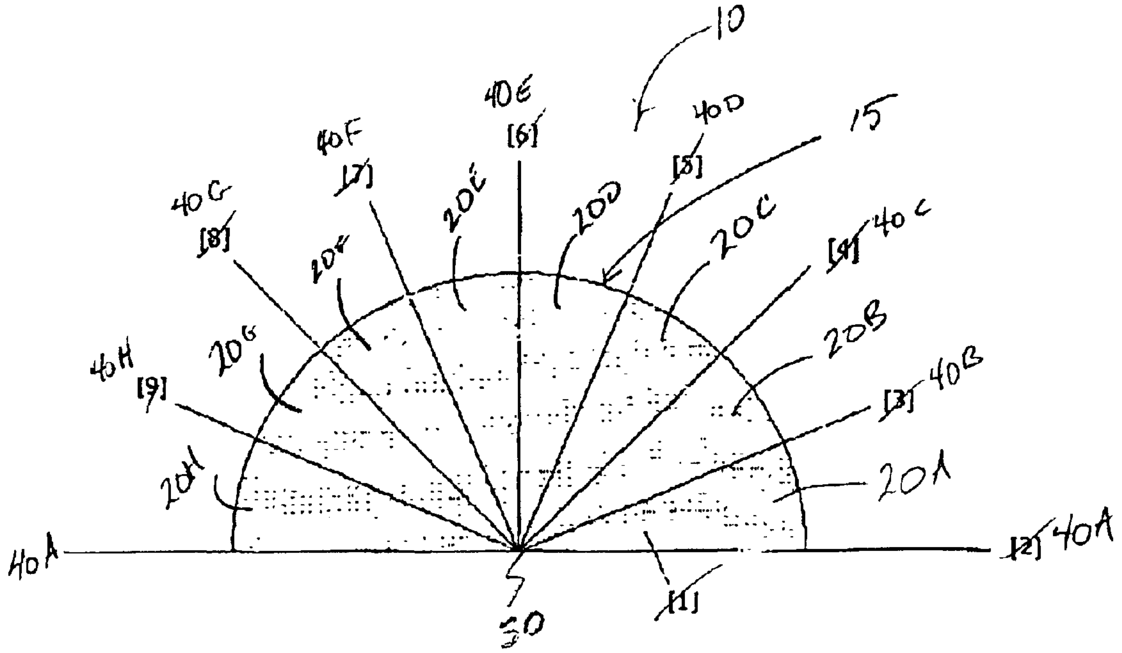
FIG. 1 is a side sectional view of a hemispherical dielectric lens formed of identical shaped wedges according to the present invention.

The present invention will now be described with reference to the drawings. Referring now to FIG. 1, a dielectric lens 10 of the present invention is illustrated. The dielectric lens has an outer surface 15 that has a substantially hemispherical or spherical shape. The hemispherical shape is formed by a finite number of orange-slice shaped wedges 20A, . . . , 20H. Each of the wedges 20A, . . . , 20H are identical in shape and size. Furthermore, each wedge is defined by a planar, surface on either side of the wedge that passes through the central point 30 of the lens. The planar surface is illustrated by the planes 40A, . . . , 40H shown in FIG. 1. Essentially all planes 40A, . . . , 40H cross along a common line, at the central point 30. In the case of the hemispherical lens, the common line may be horizontal and passing through the centre of the lens—the centre being defined as the centre of the flat circular surface (not shown) of the hemispherical lens.

The angular spacing between each pair of adjacent planes 40A, . . . , 40H is equal and in turn the angular width of the wedges 20A, . . . , 20H is also the same. The angular width of a single wedge will define the number of wedges required to fabricate a complete lens. For a high frequency operation and for large-sized dielectric lenses, the angular width is small to provide a higher accuracy approximation for optimal permittivity distribution.

It should be noted that dissimilar wedge angular widths may be utilized but this will typically increase manufacturing costs. The use of dissimilar widths could, however, produce desirable performance characteristics, such as more uniform gain over a band of frequencies, in some implementations of the present invention.

Figure 2:
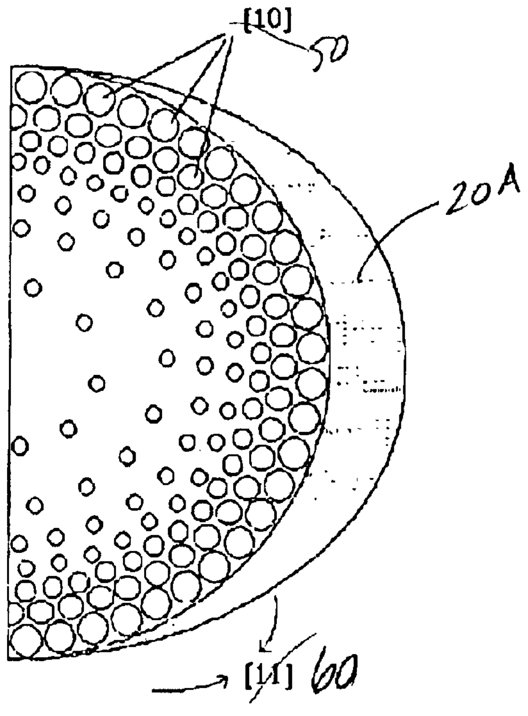
FIG. 2 is an isometric view of a wedge of FIG. 1 in further detail, illustrating a particular gap pattern in the wedge according to the present invention.

In FIG. 2, a single wedge 20A having a plurality of gaps in the dielectric 50 is illustrated according to the present invention. The angular width 60 of the wedge 20A is also clearly shown in FIG. 2. Each of the wedges 20A, . . . , 20H have gaps which are cut, molded, drilled, or produced by other means, approximately perpendicular (normal) to the radial direction of the lens. According to one embodiment of the present invention, the gaps are produced perpendicular to the radial direction in the lens approximately perpendicular to the planes defined by the wedge. The radial direction is along any line extending from the center of the lens to the outside surface of the lens. The gaps 50 provide a means of controlling the effective permittivity within the lens 10. In the wedge 20A of FIG. 2, the gaps 50 form a pattern such that the effective permittivity of the wedge varies radially in order to focus the incident radiation. As previously mentioned, the gaps are essentially air voids, however it is within the intended scope of the present invention that other material be utilized within the gaps to vary the permittivity of a particular wedge and effectively lens. The material within the gaps may be of a higher or lower permittivity than that of the surrounding lens. Different material may be used in different regions to produce a desired material or electromagnetic characteristic.

The gaps may be linearly formed either through the wedge, or partway through the wedge, from either side.

Consequently, the gaps 50 need not be precisely perpendicular to the radial direction over the entire angular width 60 of the wedge 20A. As the number of wedges in the lens fabrication increases, the angular width of the wedges decreases. Accordingly, the accuracy in the circumferential direction of the gaps and the approximation to an optimal permittivity distribution improve. Thus, increasing the number of wedges utilized in the lens enables the continuous pattern of gaps to approximate more closely an arc-shaped curve of gaps.

Figure 3:
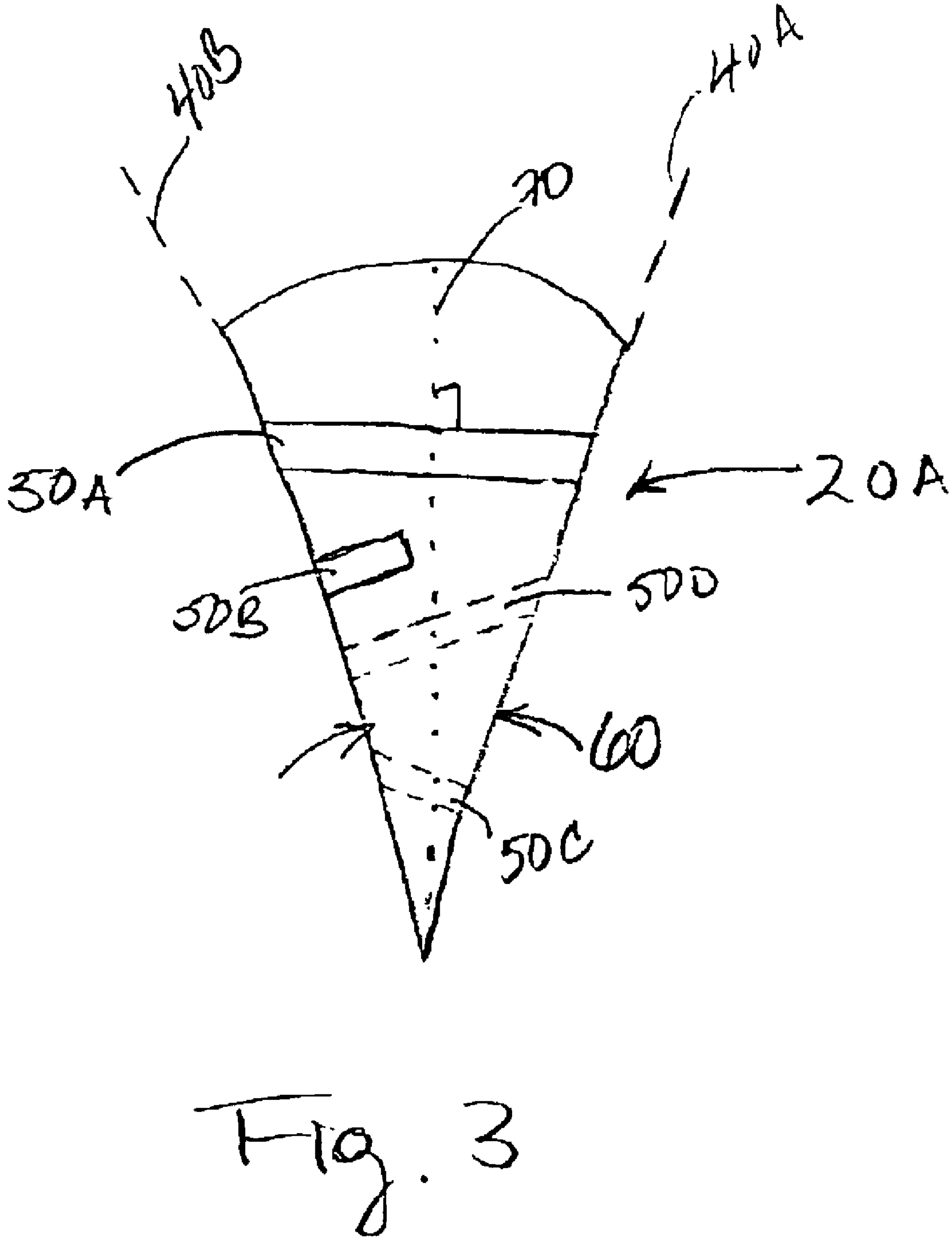
FIG. 3 is a sectional view of the wedge of FIG. 2 illustrating the location of particular gaps relative to the central radius of the wedge.

Referring now to FIG. 3, the single wedge 20A of FIG. 2 is illustrated in a sectional view. A gap 50A, belonging to the gap pattern 50 of FIG. 2, is linearly formed perpendicular to a central radius 70 of the wedge 20A. Although the gap 50A is not in turn perpendicular to the planes 40A, 40B, the hole may alternatively be drilled partway or right through and directed perpendicular to either planes 40A or 40B. In contrast to the gap 50A, a gap 50B is an example of one such gap directed perpendicular to the plane 40A. The gap 50B is only drilled partway through the wedge 20A. A pattern of gaps which are drilled either partway or entirely through the wedge may be advantageous for fabrication purposes. Gaps 50C and 50D are examples of gaps formed perpendicular to planes 40A and 40B, respectively.

While the cross-section of the gaps is shown in FIG. 2, it is within the intended scope of the present invention that other cross-sectional gap shapes such as square, rectangular, or oval may be suitable in the fabrication of the lens. For manufacturing purposes, in a molded structure this is a minor change in the tooling.

According to the present invention, the dielectric lens may also be spherical in shape and comprised of an additional number of wedges, twice that of an equivalent hemispherical lens. In the case of spherical lens, the common line, where the respective planes of the wedges converge, may be any line that passes through the centre of the spherical lens.

It should be understood that the preferred embodiments mentioned here are merely illustrative of the present invention. Numerous variations in design and use of the present invention may be contemplated in view of the following claims without straying from the intended scope and field of invention herein disclosed.

What is claimed is:

1. A method of fabricating a dielectric lens including the steps of:

a) forming a plurality of wedges from a dielectric material, each of said plurality of wedges being substantially identical and orange-slice shaped, each of said plurality of wedges having two planar surfaces separated by an angular width, and each of said plurality of wedges having a plurality of gaps for altering an effective permittivity of said dielectric lens; and b) assembling a hemispherical lens by connecting said plurality of wedges along said planar surfaces such that each of said planar surfaces intersect along a common line.

2. A method of fabricating a dielectric lens as defined in claim 1, further including the step of forming said plurality of gaps in each of said plurality of wedges.

3. A method of fabricating a dielectric lens as defined in claim 2, wherein each of said plurality of gaps are air voids.

4. A method of fabricating a dielectric lens as defined in claim 3, wherein said air voids are filled with a material having a permittivity different from that of a surrounding lens.

5. A method of fabricating a dielectric lens as defined in claim 3, wherein said plurality of gaps form a pattern of gaps within said dielectric lens.

6. A method of fabricating a dielectric lens as defined in claim 5, wherein said gaps provide an optimal permittivity distribution within said dielectric lens.

7. A method of fabricating a dielectric lens as defined in claim 3, wherein said plurality of gaps are formed approximately perpendicular to at least one of said planar surfaces in each of said plurality of wedges.

8. A method of fabricating a dielectric lens as defined in claim 3, wherein said plurality of gaps are formed approximately perpendicular to a central radius within each of said plurality of wedges.

9. A method of fabricating a dielectric lens as defined in claim 1, wherein each of said plurality of wedges is formed of cross-linked polysterene.

10. A dielectric lens including a plurality of wedges being formed from a dielectric material, each of said plurality of wedges being substantially identical and orange-slice shaped and including two planar surfaces separated by an angular width, and each of said plurality of wedges having a plurality of gaps for altering an effective permittivity of said dielectric lens, wherein said plurality of wedges form said dielectric lens by connecting said plurality of wedges along said planar surfaces such that each of said planar surfaces intersect along a common line.

11. A dielectric lens as defined in claim 10, wherein said dielectric lens forms a hemispherical dielectric lens.

12. A dielectric lens as defined in claim 10, wherein said dielectric lens forms a spherical dielectric lens.

* * * * *